US006197199B1

(12) United States Patent
McArdle

(10) Patent No.: US 6,197,199 B1
(45) Date of Patent: *Mar. 6, 2001

(54) USE OF PROTEIN-POLYSACCHARIDE COMPLEX IN REMOVAL OF CONTAMINANTS

(76) Inventor: Blaise McArdle, 17 Leonard St., Annisquam, MA (US) 01930-1321

( * ) Notice: Subject to any disclaimer, the term of this patent is extended or adjusted under 35 U.S.C. 154(b) by 0 days.

This patent is subject to a terminal disclaimer.

(21) Appl. No.: 08/820,264

(22) Filed: Mar. 18, 1997

Related U.S. Application Data

(63) Continuation-in-part of application No. 08/779,455, filed on Jan. 7, 1997, now Pat. No. 5,942,123, which is a continuation-in-part of application No. 08/523,162, filed on Sep. 5, 1995, now Pat. No. 5,591,473.

(51) Int. Cl.$^7$ .................................................. B01D 15/00
(52) U.S. Cl. ............................ 210/684; 134/7; 134/25.1; 208/262.5; 210/688; 210/690; 210/691; 210/749; 210/909
(58) Field of Search .............................. 208/262.1, 262.5; 210/502.1, 506, 684, 688, 690, 691, 777, 778, 749, 909; 426/573; 134/7, 25.1

(56) References Cited

U.S. PATENT DOCUMENTS

| 4,007,258 | 2/1977 | Cohen et al. ........................ 424/22 |
| 4,327,027 | 4/1982 | Howard et al. ................... 260/340.3 |
| 4,337,368 | 6/1982 | Pytlewski et al. ................... 568/730 |
| 4,349,380 | 9/1982 | Pytlewski et al. ................... 75/0.5 A |
| 4,351,718 | 9/1982 | Brunelle ................................ 208/262 |
| 4,353,793 | 10/1982 | Brunelle ................................ 208/262 |
| 4,400,552 | 8/1983 | Pytlewski et al. ................... 568/715 |
| 4,417,977 | 11/1983 | Pytlewski et al. ................... 208/262 |
| 4,430,208 | 2/1984 | Pytlewski et al. ................... 208/262 |
| 4,447,541 | 5/1984 | Peterson .............................. 435/264 |
| 4,460,797 | 7/1984 | Pytlewski et al. ................... 568/715 |
| 4,471,143 | 9/1984 | Pytlewski et al. ................... 568/715 |
| 4,483,716 | 11/1984 | Heller ...................................... 137/7 |
| 4,523,043 | 6/1985 | Pytlewski et al. ................... 568/840 |
| 4,574,013 | 3/1986 | Peterson .................................. 134/2 |
| 4,602,994 | 7/1986 | Pytlewski et al. ................... 208/262 |
| 4,663,027 | 5/1987 | Mendiratta et al. ................. 208/262 |
| 4,675,464 | 6/1987 | Rogers et al. ....................... 585/538 |
| 4,685,220 | 8/1987 | Meenan et al. ......................... 34/10 |
| 4,761,221 | 8/1988 | Rossi et al. .......................... 208/262 |
| 4,792,407 | 12/1988 | Zeff et al. ............................. 210/748 |
| 4,793,937 | 12/1988 | Meenan et al. ....................... 210/771 |
| 5,324,351 | 6/1994 | Oshlack et al. ...................... 106/153 |
| 5,356,467 | 10/1994 | Oshlack et al. ...................... 106/153 |
| 5,591,473 | * 1/1997 | McArdle ............................... 426/573 |

FOREIGN PATENT DOCUMENTS 118858   3/1984   (EP) .

OTHER PUBLICATIONS

Chemical Abstracts, vol. 28, No. 139620P (1975).

* cited by examiner

*Primary Examiner*—Ivars Cintins

(57) ABSTRACT

The present invention relates to a method of using a protein-polysaccharide complex composition as an adsorbent and filtering aid for in the processing of fluids or solids to absorb or decompose a variety of separable components including halogenated organic compounds such as PCBs and dioxins.

14 Claims, No Drawings

USE OF PROTEIN-POLYSACCHARIDE COMPLEX IN REMOVAL OF CONTAMINANTS

CROSS-REFERENCE TO RELATED APPLICATIONS

This application is a continuation-in-part of application Ser. No. 08/779,455 filed on Jan. 7, 1997 (now U.S. Pat. No. 5,942,123), which is a continuation-in-part of application Ser. No. 08/523,162 filed on Sep. 5, 1995 (now U.S. Pat. No. 5,591,473).

FIELD OF THE INVENTION

This invention relates generally to uses of protein complex composition, specifically, to a protein-polysaccharide complex (PPC) composition including a water-soluble polysaccharide, a substantially water-insoluble protein and optionally an acidulant, in a method of treating fluids therewith, especially for the removal of halogenated organic compounds such as polychlorinated biphenyls (PCB's).

BACKGROUND OF THE INVENTION

The hazards to public health and the environment which are posed by a variety of synthetic halogenated organic compounds are well known. Compounds such as polychlorinated biphenyls (PCB's), dibenzodioxins, dibenzofurans, dichlorodiphenyl trichloroethane (DDT), dieldrin, lindane and chlordane, as well as other halogenated pesticides, have been found to be persistent, environmentally toxic materials which require safe and efficient means of disposal. PCB's pose a particularly serious disposal problem. Once widely used as dielectric fluid additives in electrical equipment such as transformers and capacitors because of their excellent insulating properties, the use of PCB's in many applications has been banned by the U.S. Environmental Protection Agency owing to the cumulative storage of PCB's in the human body and the extremely high toxicity of PCB's. PCBs are a class of chemically inert, chlorinated hydrocarbons. It is reported that over a billion pounds of PCBs have been manufactured in the United States, and it is estimated that 300 million pounds of these are in chemical landfills and about 750 million pounds are still in use.

The problems associated with PCB contamination in New Bedford, Mass. (EPA Region I), the Hudson River in New York (EPA Region II), and in Waukegan, Ill. (EPA Region V) are highly publicized to be among the worst in the United States in terms of concentration and total quantity of PCBs. The PCB contamination problems pose threats to both drinking water and the fishing industry. There are also many industrial lagoons contaminated with PCB's. Thus, methods for the removal and/or destruction of halogenated organic compounds such as PCB's are required.

Various methods for the removal and/or the destruction or decomposition of halogenated organic compounds are known in the art. For example, the Peterson U.S. Pat. Nos. 4,447,541 and 4,574,013 disclose methods for decontaminating soil which is contaminated with halogenated organic compounds. The Peterson U.S. Pat. No. 4,447,541 discloses a process in which a reagent mixture of an alkaline constituent and a sulfoxide catalyst (DMSO) are intimately mixed with soil contaminated with PCB's. The reagent mixture affects a desorption of the halogenated contaminants from the soil and subsequently dehalogenates the contaminants. However, this process is disadvantageous in that the kinetics are relatively slow and therefore reduction of the PCB concentration to an acceptable level requires extended time periods ranging from weeks to months, the soil must be completely dry for the destruction to take place, large quantities of the reagent are required, and the sulfoxide catalyst may potentially transport contaminants prior to their destruction. The Peterson U.S. Pat. No. 4,574,013 discloses a process wherein a heated slurry of contaminated soil is treated with a mixture of an alkaline constituent and a sulfoxide catalyst. However, this process is similarly disadvantageous in that the sulfoxide catalyst may transport contaminants into living systems, and the sulfoxide catalyst produces odorous compounds when heated to high temperatures and decomposes into combustible byproducts under elevated temperature conditions. This process is also disadvantageous in that it requires large amounts of reagents.

The Rogers et al U.S. Pat. No. 4,675,464 discloses a method for the chemical destruction of halogenated aliphatic hydrocarbons, and more particularly a method for the chemical destruction of ethylene dibromide. An alkali metal hydroxide is dissolved in an ethylene glycol and the resulting product is reacted with the halogenated hydrocarbon. Rogers et al further disclose that the reaction temperature should be maintained at 30 deg. C. or less to maintain the reaction products in solution.

The Pytlewski et al U.S. Pat. No. 4,400,552 discloses a method for the decomposition of halogenated organic compounds which employs a reagent comprising the product of the reaction of an alkali metal hydroxide with a polyglycol or a polyglycol monoalkyl ether, and oxygen. The Pytlewski et al U.S. Pat. Nos. 4,337,368 and 4,602,994 disclose similar methods of decomposing halogenated organic compounds. Additionally, the Pytlewski et al U.S. Pat. Nos. 4,430,208, 4,417,977, 4,460,797 and 4,471,143 also disclose methods for separation and/or decomposition of halogenated organic compounds. However, these methods are disadvantageous in that excess amounts of the alkali metal hydroxide and polyglycol reagents are required in order to obtain a homogeneous distribution throughout the contaminated material, for example soil, sediment, sludge or the like, which is treated. The Pytlewski et al U.S. Pat. Nos. 4,349,380 and 4,523,043 disclose the use of reagents made from an alkali metal or alkali metal hydroxide and a polyglycol or a polyglycol monoalkyl ether for removing metals from metal-containing materials and for decomposing organo sulfur compounds, respectively. Similarly, the Brunelle U.S. Pat. Nos. 4,351,718 and 4,353,793 disclose methods for removing polyhalogenated hydrocarbons from nonpolar organic solvent solutions by treating the contaminated solutions with a mixture of polyethylene glycol and an alkali metal hydroxide. These methods are similarly disadvantageous in that excess amounts of reagent are required.

Additional methods for removing and/or destructing halogenated organic compounds contained in contaminated materials are disclosed in the Howard et al U.S. Pat. No. 4,327,027, the Heller U.S. Pat. No. 4,483,716, the Mendiratta et al U.S. Pat. No. 4,663,027, the Meenan et al U.S. Pat. Nos. 4,685,220 and 4,793,937, the Rossi et al U.S. Pat. No. 4,761,221, the Zeff et al U.S. Pat. No. 4,792,407, European Patent Application No. 118,858, Chemical Abstracts, Vol. 82, No. 139620P (1975) and Kornel et al, Journal of Hazardous Materials, 12 (1985), pages 161–176. However, these and additional processes known in the art for the removal and/or destruction of halogenated organic compounds in contaminated materials are inadequate in view of the time required for acceptable levels of removal and/or destruction, the use of excessive amounts of various reagents, the use of expensive reagents, the production of toxic and/or combustible byproducts, and/or the failure to obtain desired removal and/or destruction levels. Thus, a need exists for additional methods for the removal and/or destruction of halogenated organic compounds in contaminated materials, which methods overcome the disadvantages of the prior art.

Proteins or prolamines, such as zein, have many utilities due to their amphoteric nature. Proteins have been used in a wide variety of applications including in the production of paper coatings, grease-resistant coatings, laminated boards, solid color prints, printing inks, food coatings, and microencapsulants. Prolamines are substantially insoluble in water and in alcohol but are soluble in alcohol-water mixtures. It is desirable to produce and use these protein complexes in applications such as absorbents, filtering aids, odor suppressants and as a coagulants or clarifying agents, in fluids, especially aqueous, environments to utilize the amphoteric characteristics of the protein components.

It is an object of the present invention to provide a method of processing fluids and particulate solids such as soils containing polychlorinated biphenyls (PCB's), dibenzodioxins, dibenzofurans, dichlorodiphenyl trichloroethane (DDT), dieldrin, lindane and chlordane, as well as other halogenated contaminants and pesticides, with fine to very fine protein-polysaccharide complex composition particles or solutions thereof, to separate off undesired substances contributing to contamination.

It is an object of the present invention to produce a water soluble complex containing both a substantially water insoluble protein and a polysaccharide displaying beneficial characteristics of both proteins and polysaccharides, useful as an adsorbent, coagulant or a clarifying agent, a stabilizing and filtering aid, and as a filter coating having predetermined or predictable physical or chemical properties suitable for specific purposes, so that it is possible, with structurally straightforward apparatus, to carry out qualitatively high value stabilizations, coagulations and separation filtrations.

It is an object of the present invention to provide a process for the production of a protein complex formed by impregnating or coating a polysaccharide with a substantially water-insoluble protein to form an adsorbent, coagulant or a clarifying agent, a stabilizing and filtering aid, and a filter coating for use in separating polychlorinated biphenyls (PCB's), dibenzodioxins, dibenzofurans, dichlorodiphenyl trichloroethane (DDT), dieldrin, lindane and chlordane, as well as other halogenated contaminants and pesticides, and heavy metals.

Accordingly, it is the primary objective of the present invention to overcome these and other prior art disadvantages by providing a composition useful for the decontamination, or detoxification, of contaminated or toxin-polluted streams, and process for the passage of a contaminant-containing or toxin-polluted stream through a bed of said composition to decontaminate or detoxify said stream.

A specific object is to provide novel compositions suitable for use in the continuous decontamination, or detoxification of contaminated, or toxic chemical-containing streams brought into contact therewith at high detoxification rates.

A further object is to provide a process utilizing these compositions, and others, for the decontamination or detoxification of toxic chemical-containing streams contacted therewith.

Still other objects and advantages of the invention will in part be obvious and will in part be apparent from the specification.

SUMMARY OF THE INVENTION

The invention relates to the use of a protein-polysaccharide complex (PPC) containing composition including at least one water-soluble polysaccharide and at least one substantially water-insoluble protein as an adsorbent, filtering aid, an odor suppressant and as a cleaning agent, coagulant or clarifying agent, and to methods of treating contaminated soils or fluids therewith. The present invention relates to a method of treating soils or filtering fluids by separating polychlorinated biphenyls (PCB's), dibenzodioxins, dibenzofurans, dichlorodiphenyl trichloroethane (DDT), dieldrin, lindane and chlordane, as well as other halogenated contaminants and pesticides, out of the fluids or soils. Various filter aid components or cleaning compositions containing PPC are: dosed to the contaminated soil or untreated fluid (unfiltered matter) to absorb the contaminates into the cleaning composition or by forming a filter cake by deposition; or are coated on or impregnated into a filter as a filter aid; thereafter, the contaminants are retained in PPC in the contaminated soil or in the filter cake or filter as the fluid passes through the treated filter. The compositions of the present invention are particularly useful for clarifying, odor suppressing or filtering fluids such as heavy metal or contaminant containing waste streams, paper mill streams, or similar liquids; specifically as an absorbent for waste water treatment; an absorbent for removing and/or degrading polychlorinated biphenyls (PCB's), dibenzodioxins, dibenzofurans, dichlorodiphenyl trichloroethane (DDT), dieldrin, lindane and chlordane, as well as other halogenated contaminants and pesticides from water, soil or sand; and an odor suppressant in sewage and processing fluid streams such as in paper mill waste streams.

DETAILED DESCRIPTION OF THE PREFERRED EMBODIMENTS

Accordingly, it is an object of the present invention to provide a new method for the decomposition and removal of halogenated organic compounds, polychlorinated biphenyls (PCB's), halogenated dibenzodioxins, halogenated dibenzofurans, dichlorodiphenyl trichloroethane (DDT), dieldrin, lindane and chlordane contained in a contaminated medium.

It is a further object of the invention to provide a method for the decomposition and removal of contaminants, such as halogenated organic compounds contained in a contaminated medium, using significantly less amounts of a contaminant removal reagent and using lower costing reagents in comparison to prior art methods.

It is a further object of the invention to provide such a method wherein environmentally acceptable levels of contaminants, such as halogenated organic compounds including PCBs and dioxins, are achieved in the treated materials.

It is a related object of the invention to provide such a method wherein the environmentally acceptable levels of contaminants in the materials are obtainable within a short period of time.

These and additional objects are achieved by the present invention which relates to methods for the removal and/or decomposition of halogenated organic compounds contained in a contaminated medium.

The methods of the invention comprise the steps of adding a protein-polysaccharide complex (PPC) containing composition to a contaminated medium containing the halogenated organic compounds. The protein-polysaccharide complex (PPC) containing composition may be in an aqueous solution which distributes the PPC throughout the medium and acts as a wetting agent, or in a solvent, or may be added as a solid dispersion or suspension or in granular form. Additionally, because the PPC reagent is well distributed throughout the medium by the aqueous solution, a uniform separation and/or destruction of the halogenated organic compounds is achieved.

The present invention comprises methods for the decomposition and removal of halogenated organic compounds contained in a contaminated medium. The contaminated medium may comprise soil, sludge, sediment or a liquid. The present methods are particularly adapted for use with liquids. The methods are suitable for use with mediums which contain up to 100,000 ppm of halogenated organic compounds, aliphatic or aromatic, for example PCB's, or even higher levels of the halogenated organic compounds. Additionally, the methods of the invention may be used for the removal of halogenated materials, for example, aldrin, dieldrin and other halogenated pesticides.

Generally, the methods of the invention comprise adding a protein-polysaccharide complex compositions of the present invention useful as an adsorbent reagent and/or filtering aid include at least one water-soluble polysaccharide, at least one substantially water-insoluble protein and optionally, but preferably, an acidulant. The protein-polysaccharide complex (PPC) composition can be used as a reagent to absorb or destruct contaminants as a reagent additive in granular form or in solution, as a filtering aid (either as a coagulant or a clarifying agent or as a coating on or impregnating into a filter) or as an odor suppressant. These compositions are used as reagents, filtering aids, coagulants or clarifying agents in methods for treating fluids to separate contaminants such as halogenated organic compounds including but not limited to: polychlorinated biphenyls (PCB's), dioxin (2,3,7,8-tetrachlorodibenzo-p-dioxin), halogenated dibenzodioxins, halogenated dibenzofurans, dichlorodiphenyl trichloroethane (DDT), dieldrin, lindane and chlordane, as well as other halogenated contaminants and pesticides, out of the fluids. These compositions are used as reagents, filter aids, coagulants and clarifying agents and are dosed to the untreated fluid (unfiltered matter) for forming a filter cake by deposition; or are coated on or impregnated into a filter as a filter aid. Thereinafter, the solid matter particles consisting of the contaminant and the PPC reagent are retained in the PPC filter cake or in the filter as the treated fluid passes through the treated filter. Thus, the present process is applicable for treating a liquid to remove a contaminant contained in the liquid by contacting the liquid containing the contaminant with a reagent comprising a protein-polysaccharide complex composition comprising between about 90% to 99.5% by weight of a water-soluble polysaccharide impregnated with between about 10% to 0.5% by weight of a substantially water-insoluble protein to purify the liquid, whereby a significant portion of the contaminant is separated the liquid and the reagent and the separated contaminant are readily separable from the purified liquid. The present process is preferably suitable for decontaminating contaminated medium contains up to 100,000 ppm of halogenated organic compounds, however higher amounts of such contaminants can be removed.

The present invention relates to a method of manufacturing contaminant absorbing or reactive reagents, filtering aids, coagulants or clarifying agents, and odor suppressants and to a method of using a protein-polysaccharide complex composition in the processing of fluids, including gases and liquids, to extract or separate a variety of separatable dissolved or undissolved components and contaminants. The PPC adsorbent, coagulant, clarify agent and filtering aid of the present invention may be used to filter out or to absorb a large variety of separatable metal components such as metals including lead from water supplies; silver, mercury, lead, gold, copper and cadmium and other metals from spent plating solutions or aqueous industrial streams. In industry, for instance, it is desirable to recover silver from spent photo-processing solutions, and also for mitigation of waste stream pollution due to heavy metals in general. It is further preferably desirable to complex residual heavy metals with treating agents including sulfur containing compounds such as sulfides and chlorides to aid in the flocculation or filtration recovery of the heavy metals using the VPP reagents of the present invention.

The present invention also relates to a process of deactivating contaminants in solids such as soils by contacting the solids with a contaminant absorbing or reactive PPC reagent. The present invention also relates to a method of using a protein-polysaccharide complex composition in the decontamination processing of solids, such as soils and beaches, by contacting the solids containing a contaminant with the protein-polysaccharide complex composition, whereby a significant portion of the contaminant in solids is either decomposed or absorbed into the protein-polysaccharide complex and thereby essentially deactivated. The PPC reagent is preferable applied to the contaminated solids by pouring a solution containing the PPC reagent onto the contaminated solids. Alternatively, the PPC containing reagent can be applied to the contaminated solids by applying a PPC powder onto the surface of or in admixture with the contaminated solids and subsequently wetting the PPC reagent with water by hand-watering or by natural rainfall.

It has been determined that the PPC compositions of the present invention complex with contaminants such as halogenated organic compounds, including PCBs and dioxins, thus enabling removal of such contaminants from aqueous solutions, silicone oil, and hydrocarbon fluids by coagulation, precipitation or filtration.

The PPC compositions of the present invention are useful in the treatment of solids, such as soils, to inactivate halogenated organic compounds, including PCBs and dioxins, as a portion of these halogenated organic compounds apparently degrade upon contact with the PPC compositions.

The amount of any such PPC composition to be utilized has been found to be independent, in general, of the particular contaminant to be removed or malodor to be neutralized. The amount of PPC composition used, however, depends on the medium in which the PPC composition is used, the amount of contaminant to be removed by the PPC composition, and often in gas fluid applications, the gas volume and gas circulation rate.

In general, such PPC composition are effective when present in a fluid (gas or liquid) containing the malodor or containing a component to be filtered or coagulated at PPC levels as low as 0.01 mg/cubic meter of gaseous fluid or 0.1 g/cubic meter of liquid fluid to be filtered, preferably at least 0.1 g of PPC per liter of liquid treated. Of course, depending on the particular PPC compound used, some compounds are more active than others. Any concentration above this amount will generally be effective. However, from a practical point of view, more than about 10.0 to 20.0 g/cubic meter of fluid is probably unnecessary. When applied to solids, the PPC composition are effective when applied in an amount ranging from at least 0.05 grams of PPC per pound of solids, preferably at least 1 gram of PPC per pound of solids. The amount of PPC applied is dependent upon the amount of contaminant present in the solid and can be varied accordingly.

The PPC compositions of the present invention can be coated onto a porous support or filter medium such as a paper filter or other porous or fibrous type filter medium simply by dissolving a PPC composition in water and dipping the filter into the PPC solution. These coated or impregnated filters are useful in a wide variety of separation processes as will be discussed and exemplified herein.

The protein-polysaccharide complex (PPC) composition of the present invention includes a water-soluble polysaccharide, a substantially water-insoluble protein, and optionally, but preferably, an acidulant.

The polysaccharides are water-soluble, and if used to produce a product for human or animal consumption, are generally recognized as safe (G.R.A.S.) by the U.S. Food and Drug Administration. In general, the water-soluble polysaccharides are plant-derived polysaccharides and related materials such as pectin. Examples of polysaccharides that can be used to prepare the PPC composition include, but are not limited to water-soluble cellulose derivatives, seaweed polysaccharides such as alginate and carrageenin, seed mucilaginous polysaccharides, complex plant exudate polysaccharides such as gum arabic, tragacanth, guar gum, pectin, ghatti and the like, and microbially synthesized polysaccharides such as xanthan gum. In a preferred embodiment, the polysaccharides are guar gum, pectin, gum arabic and mixtures thereof.

A The polysaccharide preferably is present in an amount ranging between about 90% to 99.5% by weight of the total PPC composition, preferably in an amount ranging between about 95% to 99% by weight of the total PPC composition. The total PPC composition is defined as the total weight of the protein and polysaccharide components.

Similarly, the protein can be any protein that is predominately or substantially water-insoluble, however, vegetable proteins are advantageously utilized due to their availability. In general, the vegetable protein is a prolamine. A prolamine is a cereal-derived protein that is insoluble in water, absolute alcohol or neutral solvents and soluble in dilute (80%) alcohol. Suitable examples of prolamines include, but are not limited to, corn-derived prolamine or zein, barley-derived prolamine or hordein and wheat-derived prolamine or gliadin.

The substantially water-insoluble protein is present in an amount ranging between about 0.5% to 10% by weight of the total PPC composition, preferably in an amount ranging between about 1% to 5% by weight of the total PPC.

In a preferred embodiment of the invention, the vegetable protein or prolamine used in the composition is zein or corn gluten. Zein is extracted from corn or maize. PPC compositions containing zein are used to form odorless, tasteless, clear, hard and almost invisible films.

Sixteen amino acids have been isolated from zein including glutamic acid or glutamine, leucine, proline, alanine, phenylalanine, isoleucine, serine, tyrosine and asparagine. The remaining seven amino acids are present in amounts of less than 3% by weight. Of the eight amino acids that are necessary for protein synthesis in the human body, zein has virtually no lysine or tryptophan.

Zein is extracted from corn gluten by physical separation means as opposed to chemical separation means. Whole corn zein contains a heterogeneous mixture of disulfide linked aggregates. Commercial extraction results in a product with a molecular weight of 25,000 to 35,000. Zein contains a high proportion of hydrocarbon group side chains and has a high percentage of amide groups present with a relatively low amount of free carboxylic acid groups.

Relatively small amounts of organic acids or acidulants are used to lower the pH of the aqueous polysaccharide solutions during preparation of the PPC compositions. The acidulants enhance the water dispersibility of the PPC compositions, i.e. to facilitate reconstitution of the protein-polysaccharide complex compositions in water.

Relatively small amounts of a pH adjusting compound in the form of an acid or an acidulant are preferably used to lower the pH of the aqueous polysaccharide solutions during preparation of the PPC compositions to between 1 to 11.5, preferably about 3.8 to 8.5. The acidulants enhance the water dispersibility of the PPC compositions, thereby facilitating reconstitution of the protein-polysaccharide complex compositions in water. Although any pH adjusting acidic compound is useful in the present invention, including inorganic acids such as carbonic acid, sulfuric acid, hydrochloride acid and the like, it is preferable to utilize organic acids, preferably $C_1$ to $C_{20}$ organic acids. Suitable organic acidulants include, but are not limited to, citric acid, malic acid, adipic acid, tannic acid, lactic acid, ascorbic acid, acetic acid, fumaric acid and the like and mixtures thereof. In a preferred embodiment, citric acid is used.

The acidulants are used in an amount between about 0.25% to 5% by weight of the total PPC compositions, preferably in an amount between about 0.5% to 1% by weight. The acidulant is preferably added to the water of an aqueous organic solvent system prior to addition of the organic component.

A PPC composition is prepared by dissolving the substantially water-insoluble protein or prolamine in an aqueous organic solvent system containing the acidulant to form a protein solution. The soluble polysaccharide is then added to the protein solution to form a protein-polysaccharide complex in solution. The solvent is separated or evaporated from the solution to yield the final protein-polysaccharide complex (PPC) composition.

The aqueous organic solvent system is a mixture containing at least one organic solvent in water. Suitable organic solvents include, but are not limited to, alcohols such as ethyl alcohol and isopropyl alcohol; edible glycols such as propylene glycol and certain polyethylene glycols; and, ketones such as acetone. In a preferred embodiment of the invention, the aqueous organic solvent system is either aqueous ethyl alcohol or aqueous isopropyl alcohol. Alcohols generally can hold up to six grams of zein in solution for each 100 milliliters of alcohol.

The desired ratio of water to organic solvent in the aqueous organic solvent system is dependent on factors such as the miscibility of the solvent in the water and the amount of protein to be dissolved. When the organic solvent system is aqueous ethyl alcohol or aqueous isopropyl alcohol, the amount of water generally ranges between about 10% to 40% by weight and the amount of alcohol generally ranges between about 60% to 90% by weight. More preferably, the amount of water in such systems is between about 25% to 35% and the amount of alcohol is between about 65% to 75%.

The substantially water-insoluble protein or prolamine is added to the aqueous organic solvent system in an amount between about 100 and 300 grams of prolamine per liter of aqueous organic solvent system, more preferably in an amount between about 120 to 240 grams per liter. The dissolution is carried out at a temperature between about 20°

C. (ambient room temperature) and about 60° C., preferably about 30° C. using conventional agitation methods to form a protein solution. Soluble polysaccharide in minute fiber or particulate form is then admixed with the protein solution to form a PPC in solution.

In an alternative embodiment, a protein containing gluten such as corn gluten can be directly added into the aqueous organic solvent system instead of pure zein thus passing the zein protein portion of the gluten into solution while the deprotenated non-zein remainder of the gluten can be separated by vacuum filtering or other standard separation techniques. An incidental amount of up to 100%, preferably up to 10% by weight of deprotenated gluten can be present in the recovered in admixture with the proteinpolysaccharide complex without adversely affecting the properties of the complex.

The PPC in solution generally contains between about 90% to 99.5% of polysaccharide and between about 0.5% to 10% of a protein based on the combined total weight of the polysaccharide and the protein. More preferably, the PPC in solution contains between about 95% to 99% of polysaccharide and between about 1% to 5% of vegetable protein based on the total weight of polysaccharide and protein.

It is important that the substantially water-insoluble protein or prolamine thoroughly impregnate the soluble polysaccharide particles during the process of admixing the soluble polysaccharide with the protein solution. The aqueous organic solvent system used to prepare the protein solution should wet the soluble-polysaccharide particles so that the hydrophilic soluble polysaccharide particles are impregnated or coated with the hydrophobic protein to form the PPC solution.

The admixing process is carried out until a complete uniform mixture is attained. In general, the process is carried out at a temperature between about 20° C. and 60° C., preferably between about 20° C. and 25° C. for a time period of between about 10 and about 30 minutes, preferably between about 10 and 15 minutes. The PPC solution is agitated during the admixing process by conventional agitation methods including, but not limited to, manual shaking, mechanical shaking, magnetic stirring, mechanical stirring or a combination thereof.

Additives that promote impregnation may be added at any point during the admixing process. Suitable additives include, but are not limited to, detergents and emulsifiers. Exemplary additives are polysorbates, edible vegetable oils and egg albumin.

Dispersibility and film forming characteristics of the PPC composition can be modified by adding up to 5%, preferably 0.125% to 5%, by weight of particulate metal oxides or sulfides containing metals from Periodic Table Groups 4 to 13, preferably Groups 8 to 10, most preferably any valent form of iron oxide and iron sulfide. These metal oxides or sulfides can be added to the initial solvent system to admix with the PPC composition during formation or be subsequently added to and mixed with the dry powdered PPC composition.

The PPC solution or powder may additionally contain one or more additives at a total level of up to 20% by weight of the combined polysaccharide and protein components of the PPC composition including chelating agents, sulfides, fillers, pigments, stabilizers, thickening agents, buffers, $SiO_2$, drilling muds, borax and mineral salts depending on its application of specific use. Particularly useful fillers include: chelating agents such as organic acids useful in chelating free metals, as well as sulfides such as NaS and chlorides such as HCl useful in complexing free metals.

Once the PPC solution has been prepared, the solvent is separated or evaporated to yield a protein-polysaccharide complex composition, that is, particulate polysaccharide impregnated or complexed with a protein. Any number of solvent removal techniques may be used including, but not limited to, vacuum drying, centrifugation, evaporation, freeze drying, air drying, convection oven drying or a combination thereof.

It is preferred that the solvent removal technique be one that does not require the use of excessive or prolonged heat that will oxidatively darken the product. Although oxidative darkening has little effect on the utility of the product it may affect its appeal and desirability. One preferred method of extracting the solvent is vacuum drying which safety removes and recovers the solvent while drying the product to provide the PPC composition.

The protein-polysaccharide complex composition provided in accordance with the invention can be further processed by grinding or milling to a desired mesh particle size for use in tablets, granules, powders, pellets, extrusions, flours and the like. The dried PPC composition is preferably added to the water in an amount ranging between about 2 to 50 grams per gallon of water, preferably in an amount between about 2 to 10 grams per gallon. The PPC composition is thoroughly dispersed in the water by mixing, for example, with a mechanical stirrer to form a homogeneous dispersion.

In the preferred embodiment, the PPC composition is admixed with a liquid containing a contaminant and then the solution subjected to filtration or other separation techniques such as centrifuging to separate out the PPC and adsorbed contaminant or metal.

In another embodiment, the PPC composition can be coated onto a porous support or filter medium such as a paper filter or other porous or fibrous type filter medium simply by dissolving a PPC composition in water and dipping the filter into the PPC solution. The PPC composition is then allowed to dry on the filter surface by evaporation of the water from the solution.

In another embodiment, the previously described porous support means is a tubular filter cartridge. The filter element can also include wound layers of yarn or a similar strand material, such as nylon, orlon, polypropylene, cotton and the like. The coating step is preferably accomplished by dipping or spraying the tubular filter element in or with a PPC solution to produce a PPC-coated filter layer of between 1/16 and 2 inches thick, preferably 1/8 to 1 inch thick, and most preferably between 1/8 to 5/8 inch thick.

The PPC filter aid material referred to above is preferably coated on or impregnated into any suitable commercial porous or fibrous filter substrate, preferably made from synthetic or cellulose fibers. Suitable synthetic fibers are polyethylene, including high-density polyethylene, polypropylene, halogenated polyethylenes, polyoxymethylene, and polyamide fibers. It is desirable to form a precoat filter layer on these or any suitable commercial filter element of between about 0.00025 and 1.0 grams per square foot of filter surface, preferably 0.00025 and 0.0025 grams of PPC per square foot of filter.

Additional filter aid materials that may be incorporated into the PPC filter systems of the present invention are well known in the art and include cellulose fibers, diatomaceous earth, carbonaceous adsorbents such as charcoal, expanded perlite, asbestos fibers and polyacrylonitrile fibers. Particularly useful filter aids have heretofore been described as fillers and include: chelating agents such as organic acids well known in the art as being useful in chelating free metals, and sulfides well known in the art as being useful in complexing free metals.

A further inventive procedural technique for absorbing contaminants or filtering liquidscontaining contaminants, that in particular, can be achieved utilizing cake filters in that the PPC adsorbent reagents and/or filtering aids are disposed in on or more filter columns, and in particular in up to 10 filter columns, in such a way that a certain quantity of the unfiltered material is conveyed through one of the columns until this column has used up to about 80% of its adsorption capacity. Thereafter, the stream of unfiltered material is conveyed into another reclaiming column until again about up to approximately 80% of the adsorption capacity thereof has been used up, whereby in this manner gradually all of the not yet used up, i.e. regenerated, columns that are present are continuously connected into the circuit, while simultaneously the already used-up columns are similarly continuously regenerated one after the other.

In summary, it is to be noted that with the present invention PPC reagents, can be used as non-polluting, inexpensive adsorbents, filtering aids and/or stabilizing aids, coagulants and clarifying agents or as odor suppressants. Finally, by appropriate composition of the components and control of the process steps, it is possible to produce PPC comositions of prescribed size and permeability useful in a wide variety of separation applications.

It is also possible to regenerate precoat filter layers on porous supports by delivering a solution containing a protein-polysaccharide complex composition through said precoat filter layer, while said precoat filter layer remains on said support means. The filter is then allowed to dry and is ready for reuse.

The following examples of preparation of the PPC composition are presented for purposes of illustration only and are not to be construed to limit the scope of the invention described herein.

The present methods may be performed in either a continuous or a batch system, and, if desired, all steps may be performed in a single reactor. As will be demonstrated in the examples, the methods of the invention decompose or remove halogenated organic compounds, particularly PCB s and dioxin, to nondetectable levels. Additionally, the PPC reagents of the present methods are non-mutagenic, non-teratogenic and non-toxic to life forms.

The methods of the present invention are demonstrated in the following examples:

EXAMPLE A

A 10% zein solution was prepared by dissolving 10 grams of zein (Freeman Industries, Inc.) in 90 grams of an aqueous isopropyl alcohol solution. The aqueous isopropyl alcohol solution contained 15% water by weight and 85% isopropyl alcohol by weight. Dissolution was carried out in a 500 ml beaker and the solution was initially stirred using a mechanical stirrer at a speed of over 100 rpm in order to fully wet the zein. Once all of the zein was dispersed, the stirring speed was reduced by about ½ for an additional five minutes to insure complete dissolution of the zein in the aqueous isopropyl alcohol solution. The ambient temperature was maintained at 22° C. throughout this procedure. Accordingly, a protein solution was provided.

Two hundred grams (200 g) of milled guar gum powder (fine-60 mesh, TIC GUMS, Belcamp, Md.) was slowly added to the protein solution with vigorous stirring using a mechanical stirrer at a speed of over 100 rpm. Manual stirring was started as the mixture thickened. Additional aqueous isopropyl alcohol was added as needed to attain a soupy appearance indicative of successful impregnation of the soluble guar gum particles by the zein solution. Agitation of this soupy liquid mixture was maintained for fifteen minutes.

The resulting PPC solution was dried under reduced pressure of 0.05 atmospheres. at a temperature of 60° C. using a lab-line Duo-Vac vacuum oven manufactured by LabLine Corp., Melrose Park, Ill. The resulting dried PPC composition was a yellowish-beige color and was milled to a granular form (80 mesh).

EXAMPLE B

Fifty grams (50 g) of citric acid was added to 0.675 kg of water used to prepare 4.5 kg of an 85:15 isopropyl alcohol: water aqueous organic solvent system. Five hundred grams of zein was added to the aqueous organic solvent system in a suitable vessel. The aqueous organic solvent was kept in motion during the addition with the aid of a mechanical stirrer. Accordingly, a solution of 10% by weight of zein in aqueous alcohol was prepared.

Nine and one-half kg of guar gum was added to the 10% zein solution with mixing in a Stokes Heavy Duty sigma-type blender. After about 30 minutes of continuous mixing, the mass was homogeneous, slightly tan and had a wet, sand-like consistency. The mass was dried in an explosion-proof drier to yield a granular protein-polysaccharide complex.

EXAMPLE 1

One hundred twenty (120) grams of corn gluten supplied by ADM (Archer Daniels and Midland) was poured into a 500 ml solution of acidified (1% citric acid) isopropyl alcohol/water (70/30) and blended in a Stokes Heavy Duty sigma-type blender for 1 hour at a rate of 500 RPM's. At the end of an hour the liquid was removed from the corn gluten by vacuum drying through a filter having a porosity of one micron.

The recovered liquid was then added to 200 grams of 400 mesh guar gum (TIC GUMS, Belcamp, Md.). Additional acidified (1% citric acid) isopropyl alcohol/water (70/30 pbw) solvent was added until the mixture became soupy. The recovered PPC mixture was then dried for 24 hours and ground into an 80 screen PPC powder.

A charge of 0.1 grams of PPC powder was added to a 500 ml solution of tap water containing 1.0 mg/l of Aroclor 1254, a PCB mixture available from Monsanto Corp. having 54% chlorination. The mixture was blended for 10 minutes at 500 RPM in a glass beaker at room temperature. The liquid was then centrifuged for three minutes. The liquid was removed from the centrifuge and upon analysis using U.S. E.P.A. Method 608, a sample of the treated water displayed a concentration of Aroclor 1254(PCB) of <0.005 mg/l (4.6 $\mu$g/l). Approximately 99.5% of the Aroclor 1254(PCB) was removed from the tap water by treatment with PPC.

Extraction of PCB from the sludge material (the PPC-PCB residue) recovered from the centrifuge displayed an Aroclor 1254(PCB) content of approximately 50% of the Aroclor 1254(PCB) content originally present in the sample tap water.

EXAMPLE 2

A charge of 0.25 grams of PPC powder was added to a 300 ml solution of tap water containing 1.0 mg/l or (1 ppm)

of Aroclor 1254, a PCB mixture available from Monsanto Corp. having 54% chlorination. The mixture was blended for 5 minutes at 500 RPM in a glass beaker room temperature. The liquid was then centrifuged for 5 minutes. The liquid was removed from the centrifuge and upon analysis using U.S. E.P.A. Method 608, a sample of the treated water displayed a concentration of Aroclor 1254(PCB) of <0.005 mg/l (<5 ppb). Approximately 99.5% of the Aroclor 1254 (PCB) was removed was removed from the tap water by treatment with PPC.

EXAMPLE 3

A two liter tap water sample was spiked with 2,3,7,8-tetrachlorodibenzo-p-dioxin at a concentration of 2500 ng/liter (2500 ppb). This aqueous solution was then mixed with 2.0 g of VPP, as prepared in accordance with the procedure in Example 1, in a 4 liter amber bottle which was then shaken for one minute, allowed to settle, and then shaken for another minute. After the stated treatment, the sample was centrifuged for 5 minutes and that supernatant was then vacuum filtered through a Whatman #41 filter in a Buchner funnel. The liquid filtrate was then analyzed for dioxin/furan content using analysis per U.S. E.P.A. Method 8280. The concentration of dioxin in the filtrate was 330 ng/liter (330 ppb) displaying that 86.8% of the dioxin content was removed from the initial solution after treatment with VPP.

EXAMPLES 4 TO 13

Various aqueous solutions containing one of the following chlorinated furans and dioxins, namely: 1,2,3,7,8-pentachlorodibenzo-p-dioxin; 1,2,3,4,7,8-hexachlorodibenzo-p-dioxin; 1,2,3,4,6,7,8-heptachlorodibenzo-p-dioxin; octochlorodibenzo-p-dioxin; 2,3,7,8-tetrachlorodibenzofuran; 1,2,3,7,8-pentachlorodibenzofuran; 1,2,3,4,7,8-hexachlorodibenzofuran; 1,2,3,4,6,7,8-heptachlorodibenzofuran; and octochlorodibenzofuran were individually treated with VPP according to the procedure of Example 3. The liquid filtrates were then analyzed for dioxin or furan content using analysis technique U.S. E.P.A. Method 8280. Each of the analyzed VPP treated liquid filtrates displayed the resultant dioxin or furan concentrations shown in Table 1 and also displayed that of the dioxin content was removed from the initial solution after treatment with VPP:

TABLE 1

| Example No. | Dioxin/Furan | Final Concentration dioxin/furan (ng/L) | % dioxin/furan removed |
|---|---|---|---|
| 1 | 1,2,3,7,8-pentachlorodibenzo-p-dioxin | 350 | 86.0 |
| 2 | 1,2,3,4,7,8-hexachlorodibenzo-p-dioxin | 360 | 85.6 |
| 3 | 1,2,3,4,6,7,8-heptachlorodibenzo-p-dioxin | 380 | 84.8 |
| 4 | octochlorodibenzo-p-dioxin | 380 | 84.8 |
| 5 | 2,3,7,8-tetrachlorodibenzofuran | 300 | 88.0 |
| 6 | 1,2,3,7,8-pentachlorodibenzofuran | 370 | 85.2 |
| 7 | 1,2,3,4,7,8-hexachlorodibenzofuran | 250 | 90.0 |
| 8 | 1,2,3,4,6,7,8-heptachlorodibenzofuran | 300 | 88.0 |
| 9 | octochlorodibenzofuran | 350 | 86.0 |

EXAMPLE 14

Five grams of PPC (as prepared in Example A), 5 grams of citric acid and 5 grams of ascorbic acid were blended thoroughly into 2,000 ml of water at 500 rpm's for twenty minutes. To this solution was added 2 grams of sodium bicarbonate which was blended in by hand. The resulting mixture was allowed to stand for 10 hours until the liquid was clear.

Into the mixture was dipped a fiber filter measuring 2⅜ in.×3 3/16 in. manufactured by Star Market Co, Cambridge, Mass. 02138. After 5 seconds the filter was removed from the solution and washing in clean tap water until residual PPC was removed. The filter was then vacuum dried.

The mouths of two sterile containers were fitted with filters. One container held the PPC impregnated filter. The other container was supplied with an untreated filter of the same size and manufacture. Identical solutions of water containing 32 parts per million of lead were passed through the two filters. The solution passing through the filter that had been impregnated by the PPC solution was analyzed and contained no lead. The solution passing through the filter that had not been impregnated was analyzed and untreated filter removed none of the lead from the solution.

The PPC compositions provided in accordance with the above examples are useful in a variety of utilities including as a food preservative, a carrier for pharmaceuticals, an absorbent for waste water treatment, a surfactant to emulsify oil preparations or to control foaming characteristics of anionic and cationic surfactant blends, a carrier for inorganic compounds including metal oxides, an absorbent for removing oil from water, sand or soil, an odor suppressant, a soil stabilizing agent, a dye carrier, a herbicide, a clarifying agent or a plasticizer for polymers, a stabilizer and adhesion promoter for cement and asphalt compositions and an adhesive promoter for binding particulates including silica in polymers including natural and synthetic rubbers.

It will thus be seen that the objects set forth above, among those made apparent from the preceding description, are efficiently attained and, since certain changes may be made in the described product, and in carrying out the above process, and in the construction set forth without departing from the spirit and scope of the invention, it is intended that all matter contained in the above description shall be interpreted as illustrative and not in a limited sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:

1. A process for treating a liquid to remove a contaminant contained in the liquid comprising:

contacting a liquid containing a contaminant with a reagent comprising a protein-polysaccharide complex composition comprising between about 90% to 99.5% by weight of a water-soluble polysaccharide impregnated with between about 10% to 0.5% by weight of a water-insoluble protein to purify the liquid, and separating the resultant contaminant and reagent from the liquid.

2. The process of claim 1 wherein the contaminant is a polychlorinated biphenyl.

3. The process of claim 1 wherein the contaminant is a dioxin.

4. The process of claim 1 wherein the contaminant is selected from the group consisting of: polychlorinated biphenyls (PCB's), halogenated dibenzodioxins, halogenated dibenzofurans, dichlorodiphenyl trichloroethane (DDT), dieldrin, lindane and chlordane.

5. The process of claim 1 wherein the liquid is water.

6. The process of claim 1 wherein the liquid is silicone oil or a hydrocarbon.

7. The process of claim 1 wherein the liquid is treated with at least 0.1 g of the protein-polysaccharide complex composition per liter of liquid.

8. A method of separating metals from fluid streams containing metals comprising the steps of:

contacting a fluid containing a metal or a metal salt with a protein-polysaccharide complex composition comprising between about 90% to 99.5% by weight of a water-soluble polysaccharide impregnated with between about 10% to 0.5% by weight of a substantially water-insoluble protein to absorb the metal or metal salt in said protein-polysaccharide complex composition, and separating the fluid and the protein-polysaccharide complex composition.

9. The method of claim 8 further comprising the additional step of contacting the fluid containing a metal or a metal salt with a chloride or sulfur containing compound to complex the metal prior to contacting the fluid containing a metal or a metal salt with the protein-polysaccharide complex composition.

10. A method for the decomposition of halogenated organic compounds contained in a contaminated medium, comprising:

(a) adding a protein-polysaccharide complex composition comprising between about 90% to 99.5% by weight of a water-soluble polysaccharide impregnated with between about 10% to 0.5% by weight of a substantially water-insoluble protein to a contaminated medium containing halogenated organic compounds; and contacting said protein-polysaccharide complex composition with the contaminated medium for a time sufficient to effect decomposition of the halogenated organic compounds.

11. The method as defined by claim 10, wherein the contaminated medium comprises soil.

12. The method as defined by claim 10, wherein the contaminated medium comprises sludge.

13. The method as defined by claim 10, wherein the contaminated medium comprises a liquid.

14. The method as defined by claim 10, wherein the contaminated medium contains up to 100,000 ppm of halogenated organic compounds.

* * * * *